E. Chesterman,
Horse Boots.

Nº 81,601.  Patented Sep. 1, 1868.

Witnesses.
M. J. Kerigan
Edmund Sawyer

Inventor:
Edwin Chesterman

United States Patent Office.

EDWIN CHESTERMAN, OF BOSTON, MASSACHUSETTS.

Letters Patent No. 81,601, dated September 1, 1868.

IMPROVEMENT IN INTERFERING-STRAP FOR HORSES.

The Schedule referred to in these Letters Patent and making part of the same.

TO ALL WHOM IT MAY CONCERN:

Be it known that I, EDWIN CHESTERMAN, of the Roxbury district of Boston, in the county of Suffolk, and State of Massachusetts, have invented a new and useful Improvement in "Interfering-Straps for Horses;" and I do hereby declare that the following is a full, clear, and exact description thereof, which will enable others skilled in the art to make and use the same, reference being had to the accompanying drawing, forming part of this specification.

Similar letters of reference indicate like parts.

Figure 1:
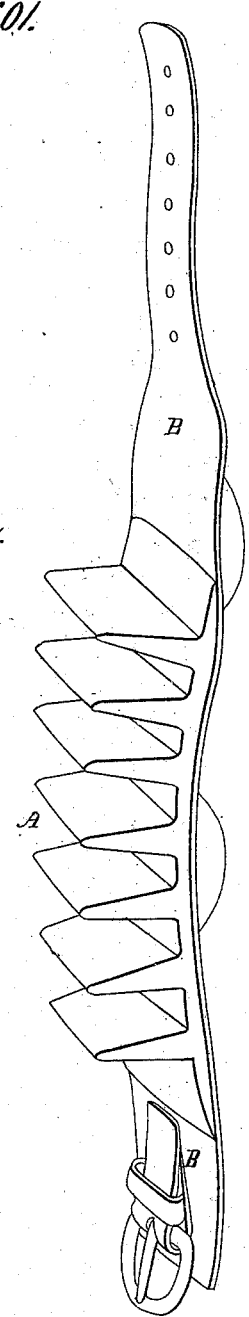
Figure 1 represents a perspective view of this invention.
Figure 2:
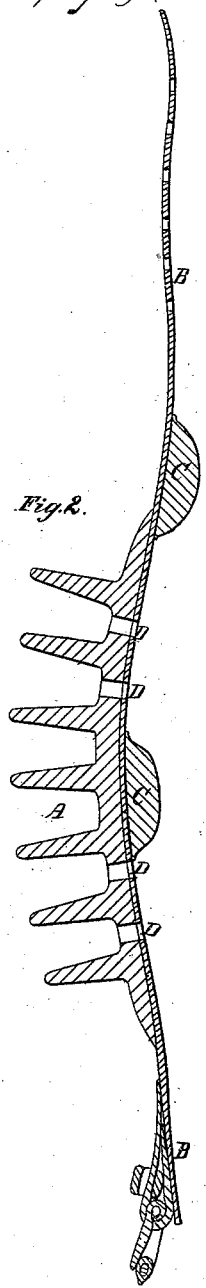
Figure 2 represents a longitudinal section.

The object of this invention is to produce an interfering-strap, which is light and durable, and does not injure the leg of the horse by galling, sweating, or blistering, and is very effective to prevent the horse from striking his foot against the leg on which the strap is placed.

The invention consists of a leather interfering-strap, having guards or projections, made of rubber, attached thereto on the outer side, and a pad or pads, made of felting, or similar material, attached thereto on the inner side.

The strap is not intended to be placed on the hoof of the horse, with which he strikes the opposite leg, but is intended to be placed on the leg of the horse which is injured by the opposite hoof striking it.

This strap, being placed on the leg and not on the hoof, will teach the horse a wider gait, and thus cure him of the habit of interfering.

If the strap is made of rubber to come next the leg, when fastened firmly enough on the leg to hold it in position, it will gall or blister the horse's leg, and if much worn, will cause the hair to come off the leg where the strap is placed, owing to the rubber being impervious to air and moisture, and not allowing the perspiration to pass away. By using a leather strap next the leg, I provide a means of escape for the perspiration from the leg, and the leather being pervious to air and moisture, it prevents galling or blistering and attendant evils.

Instead of using a leather strap next the leg, a strap made of a felted or textile material (pervious to air and moisture) may be used, but I prefer to use a leather strap.

A represents a rubber guard or projection, and is attached to an ordinary leather strap, B.

B represents a leather strap, with buckle attached to fasten it around the leg of the horse.

C C represent pads, made of felting, or similar material, and fastened into the inside of the strap. These pads are placed in such position on the strap as to fit into the hollow or thin place of the leg, and thus prevent the strap from turning round when the guard is struck by the opposite foot.

D represents holes or spaces cut through the leather strap and the rubber guard, to assist ventilation or to allow the perspiration from the leg to pass away.

Having thus described my invention, I do not claim a rubber hoof-pad or strap; but

What I do claim as new, and desire to secure by Letters Patent, is—

Leather interfering-straps, in combination with rubber guards or projections, as herein shown, for the purpose specified.

EDWIN CHESTERMAN.

Witnesses:
M. Z. KAIZER,
EDMUND SAWYER.